United States Patent
Chen

(10) Patent No.: US 10,271,521 B2
(45) Date of Patent: *Apr. 30, 2019

(54) SMART PET CHEST STRAP

(71) Applicant: Dongguan Jiasheng Enterprise Co., Ltd., Dongguan (CN)

(72) Inventor: Silong Chen, Dongguan (CN)

(73) Assignee: Dongguan Jiasheng Enterprise Co., Ltd., Dongguan (CN)

(*) Notice: Subject to any disclaimer, the term of this patent is extended or adjusted under 35 U.S.C. 154(b) by 113 days.

This patent is subject to a terminal disclaimer.

(21) Appl. No.: 15/601,011

(22) Filed: May 22, 2017

(65) Prior Publication Data

US 2018/0303068 A1 Oct. 25, 2018

(30) Foreign Application Priority Data

Apr. 19, 2017 (CN) .......................... 2017 1 0255505

(51) Int. Cl.
*A01K 27/00* (2006.01)

(52) U.S. Cl.
CPC .......... *A01K 27/002* (2013.01); *A01K 27/006* (2013.01); *A01K 27/009* (2013.01)

(58) Field of Classification Search
CPC .. A01K 11/008; A01K 11/006; A01K 27/001; A01K 27/002; A01K 27/006; A01K 27/009

See application file for complete search history.

(56) References Cited

U.S. PATENT DOCUMENTS

| | | | | |
|---|---|---|---|---|
| 7,705,736 | B1* | 4/2010 | Kedziora | A01K 11/008 340/573.3 |
| 2014/0331942 | A1* | 11/2014 | Sarazyn | A01K 29/005 119/719 |
| 2015/0342149 | A1* | 12/2015 | Lutz | A01K 27/006 119/859 |
| 2017/0135315 | A1* | 5/2017 | Marmen | A01K 15/021 |
| 2017/0215386 | A1* | 8/2017 | Pianelli | A01K 27/006 |
| 2017/0265432 | A1* | 9/2017 | Anderton | G01S 5/02 |
| 2017/0372580 | A1* | 12/2017 | Vivathana | G08B 21/0261 |
| 2018/0064068 | A1* | 3/2018 | McKee | A01K 27/009 |
| 2018/0110205 | A1* | 4/2018 | Czarnecky | A01K 15/021 |
| 2018/0132450 | A1* | 5/2018 | Goetzl | A01K 27/009 |
| 2018/0153137 | A1* | 6/2018 | Goetzl | A01K 15/022 |
| 2018/0153138 | A1* | 6/2018 | Goetzl | A01K 15/022 |
| 2018/0303068 | A1* | 10/2018 | Chen | A01K 27/002 |

* cited by examiner

Primary Examiner — Trinh T Nguyen
(74) Attorney, Agent, or Firm — Wang Law Firm, Inc.

(57) ABSTRACT

A smart pet collar includes a chest strap body, a hardware holder, and a smart hardware body. The hardware holder is locked to the chest strap body; the smart hardware body is installable into the hardware holder; the hardware holder has a latching element for latching the smart hardware body; the hardware holder has a connecting terminal child-and-mother seat corresponsive to the smart hardware body; the chest strap body includes a flexible printed circuit component; and the flexible printed circuit component has LED luminous bodies packaged by a resin. The invention has the features of powerful function, simple structure, reasonable design, and detachable components to facilitate use without affecting the pet's wearing comfortability. With the detachable structure, the tensile strength of the chest strap body is enhanced. The invention also has the effects of improving the product quality, lowering the production cost, and providing good applications.

6 Claims, 7 Drawing Sheets

SMART PET CHEST STRAP

FIELD OF INVENTION

The present invention relates to pet chest straps, in particular to a smart pet strap worn by pets and having the function of an electronic fence.

BACKGROUND OF INVENTION

1. Description of the Related Art

In general, a pet chest strap is a device used for protecting, controlling and guiding a pet, and its consumption is very large. Compared with pet collars, the pet chest strap has a large fixing area to provide a good fixing effect, and thus more and more pet owners use the pet chest strap. However, present pet chest straps just have simple structure and no longer can meet the requirements of practical use. Specifically, statistics indicate that there were more than six-million pets (including cats and dogs) were killed in car accidents last years in the United States, and most of the accidents occurred in the dark environment or the condition of insufficient light. In addition, numerous pets were missing or lost in various situations every years, and the chance of finding or getting back these missing or lost pets is very low due to lack of effective pet activity range controls and lost pet recovering measures.

Due to the large area and good fixing effect, the pet chest strap is very suitable to be used as a basic carrier of a smart device, but no smart pet chest strap product is found in the market so far.

2. Summary of the Invention

Therefore, it is a primary objective of the present invention to overcome the drawbacks of the prior art and provide a smart pet chest strap with the functions of an electronic fence, pet positioning, light reminding, and voice interaction.

To achieve the aforementioned and other objectives, the present invention provides a smart pet chest strap comprising a chest strap body, a hardware holder, a smart hardware body, a hardware holder fixed and locked to the chest strap body, characterized in that the smart hardware body is installable in the hardware holder; the hardware holder has a latching element for latching the smart hardware body; the hardware holder has a connecting terminal child-and-mother seat installed therein and configured to be corresponsive to the smart hardware body; the chest strap body includes a flexible printed circuit component clamped therein; the flexible printed circuit component has a plurality of LED luminous bodies attached thereon and packaged by a resin; the LED luminous bodies are coupled to the connecting terminal child-and-mother seat through the flexible printed circuit component and the hardware holder; the smart hardware body contains a housing, a charging port embedded into the housing, and a rechargeable battery, a control circuit board, a speaker, pickup, a GPS module, a Bluetooth module, a mobile network module, and a storage module installed in the housing; the speaker, pickup, GPS module, Bluetooth module, mobile network module are installed on the control circuit board and coupled to the circuit; the control circuit board is coupled to the rechargeable battery and the charging port; the control circuit board further includes a charging circuit corresponsive to the rechargeable battery; the control circuit board further has a SIM card slot for inserting a SIM card and connecting a mobile network module; and the housing has a hole configured to be corresponsive to the speaker and the pickup.

The flexible printed circuit component includes a U-shaped flexible substrate and a flexible n-shaped antenna, and the U-shaped flexible substrate and the flexible n-shaped antenna are coupled to each other, and the U-shaped flexible substrate has a round hole formed at a U-shaped bent position of the U-shaped flexible substrate, and a ring shaped structural reinforcing plate made of a hard material is attached by using the round hole as the center, and an LED positive electrode circuit contact, an LED negative electrode circuit contact, an antenna contact, and a grounding contact are arranged around the round hole by using round hole as the center; an electrically conductive metal layer comprises a plurality of non-contact sections, and one of the sections is coupled to the LED positive electrode contact, and one of the sections is coupled to the LED negative electrode contact, and one of the sections is coupled to the n-shaped antenna and the antenna contact, and one of the sections is coupled to the grounding contact, so that the flexible printed circuit component becomes an auxiliary antenna of the GPS module, the Bluetooth module, and the mobile network module.

Further, the hardware holder has a honeycomb reinforced structure disposed at the bottom of the hardware holder.

Further, the LED luminous body is a monochromatic lamp bead or a multi-color lamp bead.

Further, the ring shaped structural reinforcing plate has a mating hole formed thereon and provided for connection.

Further, the smart hardware body has an electrically conductive metal section printed onto an inner wall of the housing of the smart hardware body and provided for connecting the control circuit board to form an auxiliary antenna of the GPS module, Bluetooth module, or mobile network module.

Further, the flexible printed circuit component has a structural reinforcing plate installed to the LED luminous body and at a position on the back side where the U-shaped flexible substrate and the flexible n-shaped antenna are connected, and the structural reinforcing plate is provided for preventing the LED luminous body and the n-shaped antenna from falling our or separating from the U-shaped flexible substrate when the flexible printed circuit component is bent or deformed by a force.

In the present invention, the GPS module is provided for positioning a pet, and the GPS function can be used for setting up an electronic fence, so that the pet's activity is restricted within a predetermined area, and when the pet goes beyond the predetermined activity area, the speaker with a light can be used to remind both of the pet and the user, and the pickup and mobile network module can be used to achieve a remote communication between the user and the pet, so as to facilitate the user to issue an instruction from a remote end and understand the dynamic information of the pet.

The present invention has the features of powerful function, simple structure, reasonable design, and detachable components to facilitate its use without affecting the pet's wearing comfortability. The detachable structure can be used to enhance the tensile strength of the chest strap body conveniently and independently. The invention also has the effects of improving the product quality, lowering the production cost, and providing good applications.

DESCRIPTION OF THE PREFERRED EMBODIMENTS

The above and other objects, features and advantages of this disclosure will become apparent from the following detailed description taken with the accompanying drawings.

Figure 1:
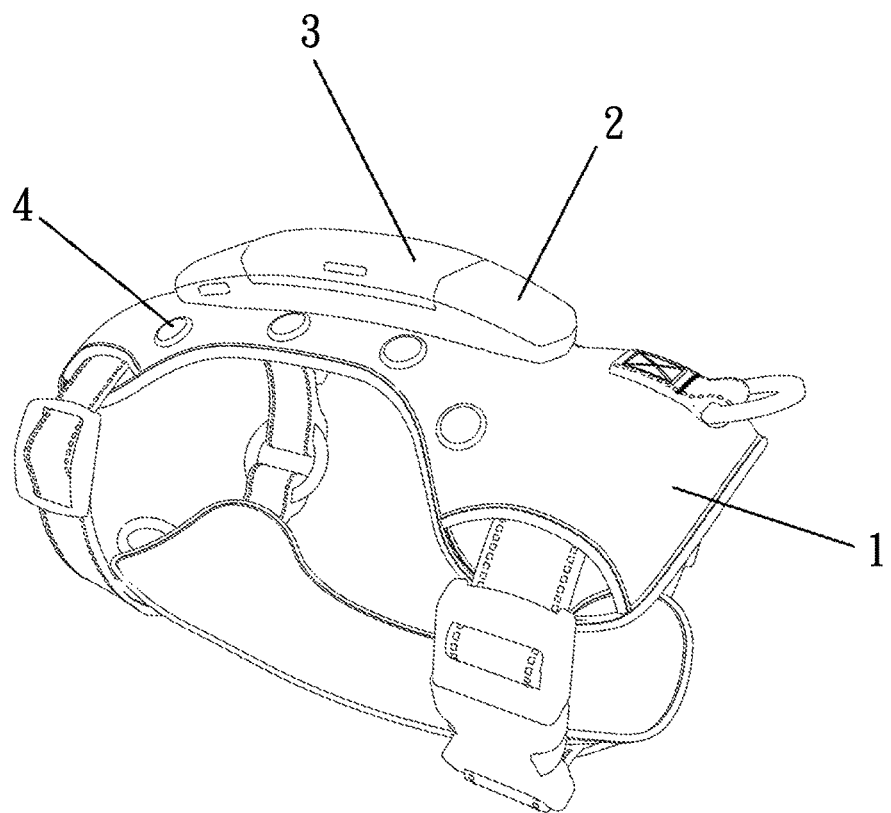
FIG. 1 is a schematic view of a smart pet chest strap in accordance with a preferred embodiment of the present invention.
Figure 2:
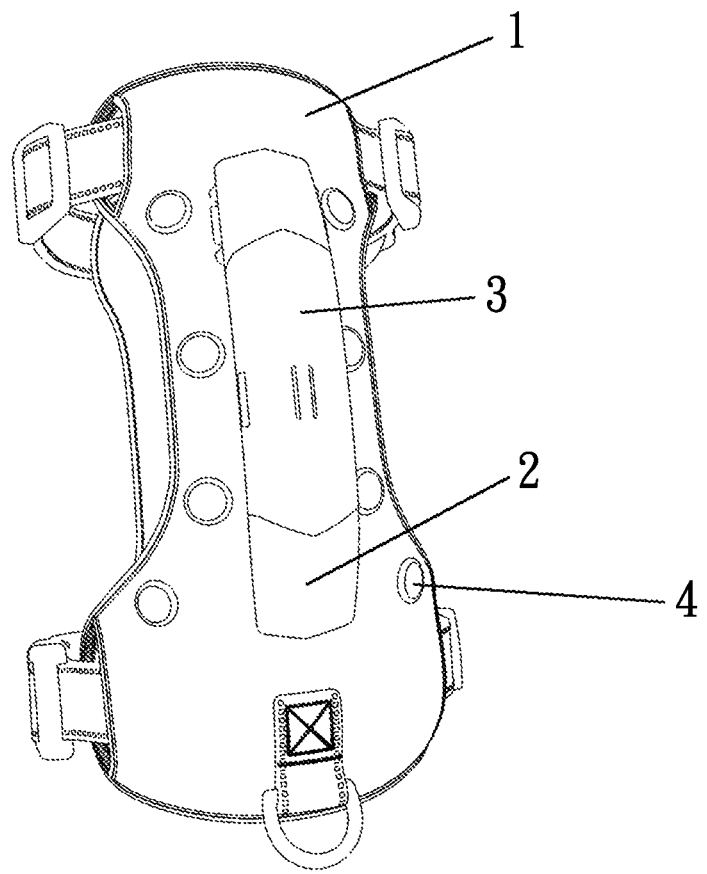
FIG. 2 is another schematic view of a smart pet chest strap in accordance with a preferred embodiment of the present invention.
Figure 3:
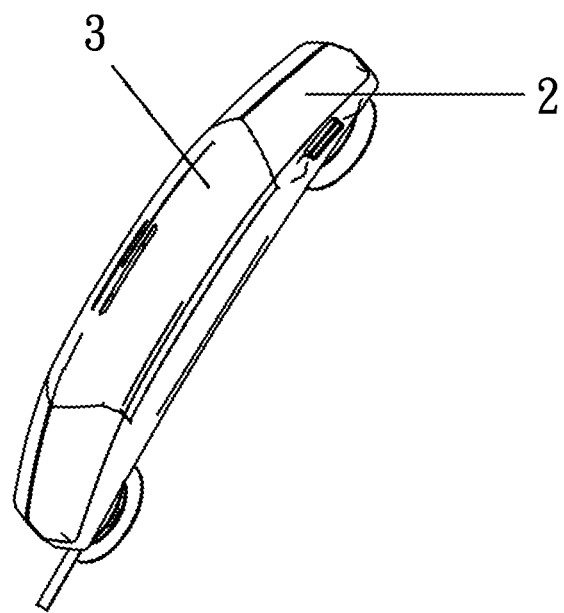
FIG. 3 is a schematic view of a smart hardware body and a hardware holder assembled with each other in accordance with a preferred embodiment of the present invention.
Figure 4:
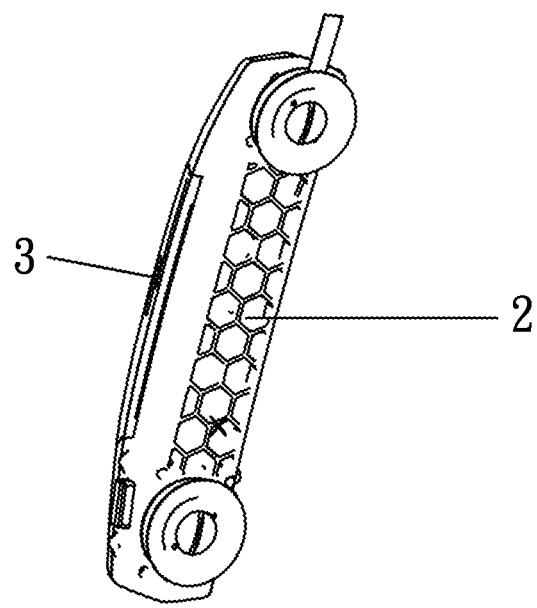
FIG. 4 is another schematic view of a smart hardware body and a hardware holder assembled with each other in accordance with a preferred embodiment of the present invention.
Figure 5:
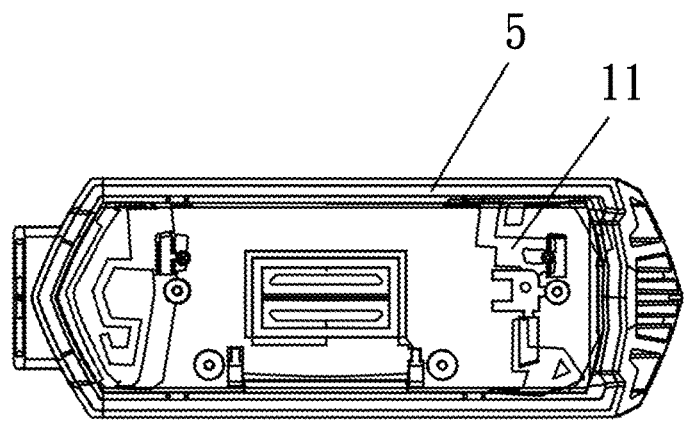
FIG. 5 is a schematic view of a flexible printed circuit component and an LED luminous body assembled with each other in accordance with a preferred embodiment of the present invention.
Figure 6:
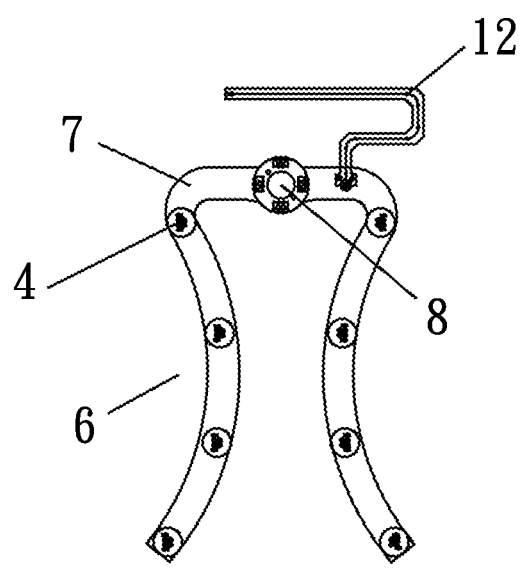
FIG. 6 is a schematic view of the backside of a flexible printed circuit device of the present invention.
Figure 7:
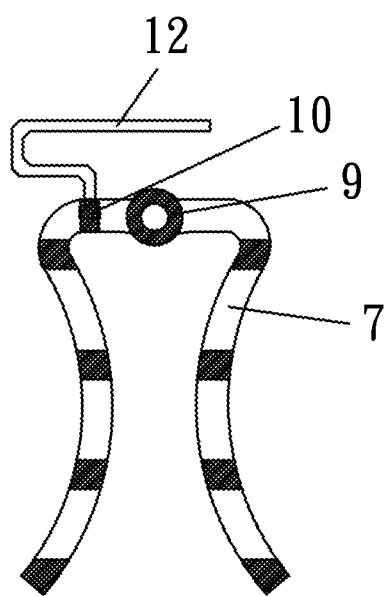
FIG. 7 is a schematic view of an electrically conductive metal section on an inner wall of a housing of a smart hardware body of the present invention.

With reference to FIGS. 1 to 7 for a smart pet chest strap in accordance with the present invention, the smart pet chest strap comprises a chest strap body 1, a hardware holder 2, and a smart hardware body 3. The hardware holder 2 is fixed and locked to the chest strap body 1. The smart hardware body 3 is installable into the hardware holder 2. The hardware holder 2 has a latching element for latching the smart hardware body 3. The hardware holder 2 has a connecting terminal child-and-mother seat configured to be corresponsive to the smart hardware body 3. The chest strap body 1 includes a flexible printed circuit component 6 clamped therein. The flexible printed circuit component 6 has a plurality of LED luminous bodies 4 attached thereon and packaged by a resin. The LED luminous bodies 4 are coupled to the connecting terminal child-and-mother seat of the hardware holder 2 through the flexible printed circuit component 6. The smart hardware body 3 includes a housing 5, a charging port embedded into the housing 5, and a rechargeable battery, a control circuit board, a speaker, a pickup, a GPS module, a Bluetooth module, a mobile network module, and a storage module installed in the housing 5. The speaker, pickup, the GPS module, the Bluetooth module, and the mobile network module are installed on the control circuit board and coupled to the circuit. The control circuit board is coupled to the rechargeable battery and the charging port. The control circuit board further has a charging circuit configured to be corresponsive to the rechargeable battery. The control circuit board has a SIM card slot provided for inserting a SIM card and connecting the mobile network module. The housing has a hole configured to be corresponsive to the speaker and the pickup. The flexible printed circuit component 6 includes a U-shaped flexible substrate 7 and a flexible n-shaped antenna 12, and the U-shaped flexible substrate 7 and the flexible n-shaped antenna 12 are coupled to each other, and the U-shaped flexible substrate 7 has a round hole 8 formed at a U-shaped bent position of the U-shaped flexible substrate 7, and a ring shaped structural reinforcing plate 9 made of a hard material is attached by using the round hole 8 as the center, and an LED positive electrode circuit contact, an LED negative electrode circuit contact, an antenna contact, and a grounding contact are arranged around the round hole by using round hole 8 as the center. The electrically conductive metal layer comprises a plurality of non-contact sections, wherein one of the sections is coupled to the LED positive electrode contact, and one of the sections is coupled to the LED negative electrode contact, and one of the sections is coupled to the n-shaped antenna 12 and the antenna contact, and one of the sections is coupled to the grounding contact, so that the flexible printed circuit component 6 becomes an auxiliary antenna of the GPS module, Bluetooth module, and mobile network module. The hardware holder 2 has a honeycomb reinforced structure disposed at the bottom of the hardware holder 2. The LED luminous body 4 may be a monochromatic lamp bead or a multi-color lamp bead. The ring shaped structural reinforcing plate 9 has a mating hole formed thereon an provided for connection. The smart hardware body 3 has an electrically conductive metal section 11 printed on an inner wall of the housing 5 and provided for connecting the control circuit board to form an auxiliary antenna of the GPS module, the Bluetooth module, and the mobile network module. The flexible printed circuit component 6 has a structural reinforcing plate 10 installed to the LED luminous body 4 and at a position on the back side where the U-shaped flexible substrate 7 and the flexible n-shaped antenna 12 are connected. The structural reinforcing plate 10 is provided for preventing the LED luminous body 4 and the n-shaped antenna 12 from falling out or separating from the U-shaped flexible substrate 7 when the flexible printed circuit component 6 is bent or deformed by a force.

While the invention has been described by means of specific embodiments, numerous modifications and variations could be made thereto by those skilled in the art without departing from the scope and spirit of the invention set forth in the claims.

What is claimed is:

1. A smart pet chest strap, comprising: a chest strap body, a hardware holder, a smart hardware body, characterized in that the hardware holder is fixed and locked to the chest strap body, the smart hardware body is installable into the hardware holder; the hardware holder has a latching element for latching the smart hardware body; the hardware holder has a connecting terminal child-and-mother seat configured to be corresponsive to the smart hardware body; the chest strap body includes a flexible printed circuit component clamped therein; the flexible printed circuit component has a plurality of LED luminous bodies attached thereon and packaged by a resin; the LED luminous bodies are coupled to the connecting terminal child-and-mother seat through the flexible printed circuit component and the hardware holder; the smart hardware body includes a housing, a charging port embedded into the housing, and a rechargeable battery, a control circuit board, a speaker, a pickup, a GPS module, a Bluetooth module, a mobile network module, and a storage module installed in the housing; the speaker, pickup, GPS module, Bluetooth module, and mobile network module are installed on the control circuit board and coupled to the circuit; the control circuit board is coupled to the rechargeable battery and the charging port; the control circuit board further has a charging circuit configured to be corresponsive to the rechargeable battery; the control circuit board further has a SIM card slot provided for inserting a SIM card and connecting the mobile network module; the housing has a hole configured to be corresponsive to the speaker and the pickup; the flexible printed circuit component includes a U-shaped flexible substrate and a flexible n-shaped antenna coupled with each other, and the U-shaped flexible substrate has a round hole formed at a U-shaped bent position of the U-shaped flexible substrate, and a ring shaped structural reinforcing plate made of a hard material is attached by using the round hole as the center, and an LED positive electrode circuit contact, an LED negative electrode circuit contact, an antenna contact, and a grounding contact are arranged around the round hole by using round hole as the center; an electrically conductive metal layer comprises a plurality of non-contact sections, and one of the sections is coupled to the LED positive electrode contact, and one of the sections is coupled to the LED negative electrode contact, and one of the sections is coupled to the n-shaped antenna and the antenna contact, and one of the sections is coupled to the grounding contact, so that the flexible printed circuit component becomes an auxiliary antenna of the GPS module, Bluetooth module, and mobile network module.

2. The smart pet chest strap of claim 1, wherein the hardware holder has a honeycomb reinforced structure disposed at the bottom of the hardware holder.

3. The smart pet chest strap of claim 1, wherein the LED luminous body is a monochromatic lamp bead or a multi-color lamp bead.

4. The smart pet chest strap of claim 1, wherein the ring shaped structural reinforcing plate has a mating hole formed thereon and provided for connection.

5. The smart pet chest strap of claim 1, wherein the smart hardware body has an electrically conductive metal section printed onto an inner wall of the housing of the smart hardware body and provided for connecting the control circuit board to form an auxiliary antenna of the GPS module, Bluetooth module, or mobile network module.

6. The smart pet chest strap of claim 1, wherein the flexible printed circuit component has a structural reinforcing plate installed to the LED luminous body and at a position on the back side where the U-shaped flexible substrate and the flexible n-shaped antenna are connected, and the structural reinforcing plate is provided for preventing the LED luminous body and the n-shaped antenna from falling our or separating from the U-shaped flexible substrate when the flexible printed circuit component is bent or deformed by a force.

* * * * *